United States Patent
Solhusvik et al.

(10) Patent No.: US 8,873,882 B2
(45) Date of Patent: Oct. 28, 2014

(54) BLOOMING FILTER FOR MULTIPLE EXPOSURE HIGH DYNAMIC RANGE IMAGE SENSORS

(75) Inventors: Johannes Solhusvik, Haslum (NO); Sohrab Yaghmai, Oslo (NO); Peng Lin, Pleasanton, CA (US)

(73) Assignee: Aptina Imaging Corporation, George Town (KY)

( * ) Notice: Subject to any disclaimer, the term of this patent is extended or adjusted under 35 U.S.C. 154(b) by 620 days.

(21) Appl. No.: 13/074,976

(22) Filed: Mar. 29, 2011

(65) Prior Publication Data

US 2012/0219235 A1 Aug. 30, 2012

Related U.S. Application Data

(60) Provisional application No. 61/447,630, filed on Feb. 28, 2011.

(51) Int. Cl.
  *G06K 9/36* (2006.01)
  *G06T 5/50* (2006.01)
(52) U.S. Cl.
  CPC ......... *G06T 5/50* (2013.01); *G06T 2207/10144* (2013.01); *G06T 2207/20208* (2013.01)
  USPC .............................. 382/284; 382/274; 382/275
(58) Field of Classification Search
  CPC .................... G06T 2207/20208; H04N 5/2355
  USPC ......................................................... 382/284
  See application file for complete search history.

(56) References Cited

U.S. PATENT DOCUMENTS

| | | | | |
|---|---|---|---|---|
| 7,239,805 B2 * | 7/2007 | Uyttendaele et al. | .......... | 396/222 |
| 7,602,438 B2 * | 10/2009 | McGarvey et al. | ........... | 348/362 |
| 7,623,683 B2 * | 11/2009 | Chen et al. | .................... | 382/107 |
| 7,769,229 B2 * | 8/2010 | O'Brien et al. | ............... | 382/167 |
| 7,852,402 B2 * | 12/2010 | McGarvey et al. | ........... | 348/362 |
| 8,000,554 B2 * | 8/2011 | Li et al. | .......................... | 382/274 |
| 8,150,201 B2 * | 4/2012 | Kasai et al. | ................... | 382/274 |
| 8,159,571 B2 * | 4/2012 | Lin | .............................. | 348/254 |
| 8,385,642 B2 * | 2/2013 | Chuang et al. | ................ | 382/167 |
| 8,445,828 B2 * | 5/2013 | He | ............................ | 250/208.1 |
| 8,466,976 B2 * | 6/2013 | Morales | .................... | 348/221.1 |
| 2003/0128893 A1 * | 7/2003 | Castorina et al. | ............. | 382/284 |
| 2006/0215932 A1 * | 9/2006 | Castorina et al. | ............. | 382/284 |
| 2006/0262363 A1 * | 11/2006 | Henley | .......................... | 358/516 |
| 2010/0149340 A1 * | 6/2010 | Marks et al. | .................. | 348/169 |

(Continued)

OTHER PUBLICATIONS

Mitsunaga, T., and Nayar, S. K. 2000. High dynamic range imaging: Spatially varying pixel exposures. In IEEE CVPR, 472-479.*

(Continued)

*Primary Examiner* — Gandhi Thirugnanam
(74) *Attorney, Agent, or Firm* — Treyz Law Group; Nancy Y. Ru; Michael H. Lyons

(57) ABSTRACT

Multiple-exposure high dynamic range image processing may be performed that filters pixel values that are distorted by blooming from nearby saturated pixels. Pixel values that are near saturated pixels may be identified as pixels that may be affected by blooming. The contributions from those pixels may be minimized when producing a final image. Multiple-exposure images may be linearly combined to produce a final high dynamic range image. Pixel values that may be distorted by blooming may be given less weight in the linear combination.

12 Claims, 3 Drawing Sheets

(56) References Cited

U.S. PATENT DOCUMENTS

| | | | |
|---|---|---|---|
| 2010/0231771 A1* | 9/2010 | Yaghmai | 348/308 |
| 2010/0245635 A1* | 9/2010 | Lin | 348/254 |
| 2010/0259626 A1* | 10/2010 | Savidge | 348/208.4 |
| 2010/0271512 A1* | 10/2010 | Garten | 348/239 |
| 2010/0328482 A1* | 12/2010 | Chang et al. | 348/222.1 |
| 2011/0069204 A1* | 3/2011 | Vakrat et al. | 348/234 |
| 2011/0069906 A1* | 3/2011 | Park et al. | 382/284 |
| 2011/0149111 A1* | 6/2011 | Prentice et al. | 348/229.1 |
| 2011/0150357 A1* | 6/2011 | Prentice | 382/274 |
| 2011/0228295 A1* | 9/2011 | Doida | 358/1.9 |
| 2012/0105681 A1* | 5/2012 | Morales | 348/239 |
| 2012/0162379 A1* | 6/2012 | Dahi et al. | 348/47 |
| 2012/0194686 A1* | 8/2012 | Lin et al. | 348/208.4 |
| 2012/0219235 A1* | 8/2012 | Solhusvik et al. | 382/275 |
| 2013/0051700 A1* | 2/2013 | Jo | 382/284 |

OTHER PUBLICATIONS

Paul E. Debevec and Jitendra Malik. Recovering High Dynamic Range Radiance Maps from Photographs, Proceedings of SIGGRAPH 97, Computer Graphics Proceedings, Annual Conference Series, pp. 369-378 (Aug. 1997, Los Angeles, California).*

* cited by examiner

BLOOMING FILTER FOR MULTIPLE EXPOSURE HIGH DYNAMIC RANGE IMAGE SENSORS

This application claims the benefit of provisional patent application No. 61/447,630, filed Feb. 28, 2011, which is hereby incorporated by reference herein in its entirety.

BACKGROUND

The present invention relates to blooming filters, and more particularly, to blooming filters for multiple exposure high dynamic range image sensors.

A multiple exposure method can be used to produce high dynamic range images. High dynamic range images are images with a high brightness contrast. Multiple images may be taken that have different exposure times. Typically, long exposure images can better capture low-lit parts of a scene and short exposure images can better capture bright parts of a scene. The multiple-exposure images are combined during image processing to form a high dynamic range image.

Conventional image processing methods often minimize the contribution of saturated pixel values to the final image by using pixel values from short-exposure images for bright portions of a scene. However, photons that are received at saturated pixels may cause charge to overflow onto neighboring pixels, in an effect that is known as blooming. Pixel values that are distorted by blooming charge effects may have non-linear values and may create image artifacts. Conventional image processing methods do not take into account blooming effects when processing multiple exposure high dynamic range images.

It may therefore be desirable to have improved methods for processing multiple exposure high dynamic range images that reduce the effects of blooming.

DETAILED DESCRIPTION

Figures 1, 2:
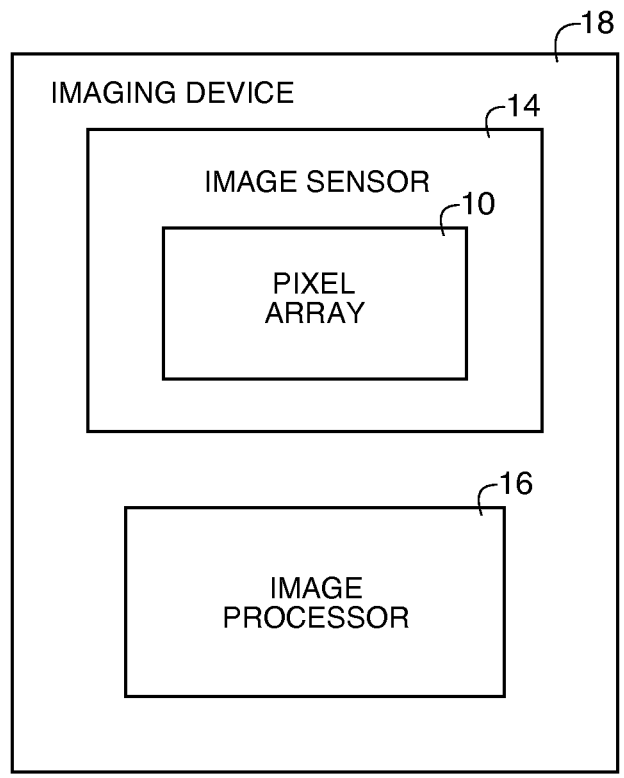
FIG. 1 is a diagram of an illustrative imaging device having an image sensor and an image processor in accordance with an embodiment of the present invention.
FIG. 2 is a diagram of an illustrative pixel array in accordance with an embodiment of the present invention.

In order to capture high dynamic range images, e.g., images that have a large contrast between the brightest and darkest parts of the images, a technique can be used that first captures multiple images at different exposures. An image with a short exposure time can better capture brightly lit areas of a scene while an image with a long exposure time can better capture darker areas of a scene. After the multiple exposure images are captured, the images are combined into a single image.

During image processing, typically pixel values from the short exposure images are emphasized in the final image for the bright areas of the scene while pixels values from the long exposure image are emphasized in the final image for the low-lit areas of the scene. For areas with intermediate brightness levels, a combination of pixel values from the multiple exposure images can be in determining the final pixel values.

In an example of two input images, one having a long exposure time and one having a short exposure time, let $T_1(x, y)$ be an array of pixel values for the long exposure image and let $T_2(x, y)$ be an array of pixel values for the short exposure image, where (x,y) represents the locations of the pixels. Let R be the exposure ratio between the first exposure time T1 and the second exposure T2. The final image H(x,y), often known as the high dynamic range (HDR) image, can be generated according to the following:

$$H(x, y) = \begin{cases} T_1(x, y), & \text{if } T_1(x, y) < S_1 \\ R * T_2(x, y), & \text{if } T_1(x, y) > S_2 \\ \frac{[(S_2 - T_1(x, y)) * T_1 + (T_1(x, y) - S_1) * R * T_2(x, y)]}{(S_2 - S_1)}, & \text{otherwise} \end{cases} \quad (1)$$

where $S_1$ and $S_2$ are the threshold values for the HDR linear combination, where $S_1 < S_2$.

For pixel locations where $T_1(x, y)$ is less than threshold value $S_1$, i.e. the darker areas of the long exposure image, the values of the long exposure image $T_1(x, y)$ are taken for the final image H(x, y) For pixel locations where $T_1(x, y)$ is greater than threshold value $S_2$, i.e., the brighter areas of the long exposure image, the values of the shorter exposure image $T_2(x, y)$, multiplied by the exposure ratio, are taken for the final image H(x, y). In intermediate regions between $S_1$ and $S_2$, a linear combination of $T_1(x, y)$ and $R*T_2(x, y)$ is used for the final image H(x,y). For an image where the dynamic range is 12-bits, or 4096, values for the threshold values can be taken as $S_2=3900$ and $S_1=S_2-S_{21}$ with $S_{21}=1024$.

Pixels located at bright areas, especially in long exposure images, can be saturated. Pixel values for these saturated pixels are not accurate and are not linear with the actual brightness of the scene being captured. The algorithm of equation (1), short exposure image values $T_2(x,y)$ are used for pixel locations where long exposure values $T_1(x,y)$ are very bright (i.e. greater than $S_2$), which can avoid the contribution from any saturated pixels in the long exposure image $T_1(x,y)$.

However, when pixels are saturated, charge from the saturated pixels can overflow onto neighboring pixels, distorting the pixel values of the neighboring pixels and creating color artifacts, in an effect that is known as blooming. Pixels that are affected by blooming are not necessarily saturated. For example, blooming-affected pixel values can fall in the regime $S_1 < T_1(x,y) < S_2$, in which a linear combination of both input images is used for the final image. This is not desirable when pixel values from the long exposure image are distorted from blooming. An improved algorithm is therefore needed to take into account the effects of blooming.

An imaging device such as imaging device 18 of FIG. 1 may have an image sensor 14 and an image processor 16. Image processor 16 may process images captured by image sensor 14. Image processor 16 may be located on the same integrated circuit as image sensor 14. If desired, image processor 16 and image sensor 14 may be located on different integrated circuits. If desired, image processor 16 may be located on a separate device other than imaging device 16.

Image sensor 14 may have a pixel array 10. As shown in FIG. 12, pixel array 10 has pixels 12. In general, an image sensor may have any suitable number of pixels, such as thousands of pixels, millions of pixels (megapixels), or more. Pixels may detect light using photodiodes.

Image sensor 14 may capture multiple images that are combined to form an output image that may be a high dynamic range image. An image may be referred to as a high dynamic range image if it has dynamic range is relatively higher than that of other images. For example, when multiple input images are combined to form an output image that has a dynamic range that is higher than the dynamic ranges of the input images, the output image may be referred to as a high dynamic range image. Image sensor 14 may be referred to as a high dynamic range image sensor.

With a multi-exposure technique, image sensor 14 may capture multiple images of the same scene, in which the multiple images have different exposure times. Exposure times may also be referred to as integration times, especially when images are captured using photodiodes. Images may be still images or video images. For video images, the multiple-exposure images may be taken in the same frame time.

The multiple-exposure images may each have an array of pixel values. The pixel values may have associated pixel positions within the array. Since the multiple-exposure images are all taken of the same scene, the pixel positions are aligned between images. For example, a given pixel position be associated with pixel values in each of the input images. For a given pixel position, the associated pixel values in the input images may be combined to produce a pixel value for the given pixel position in the output image.

Figure 3A:
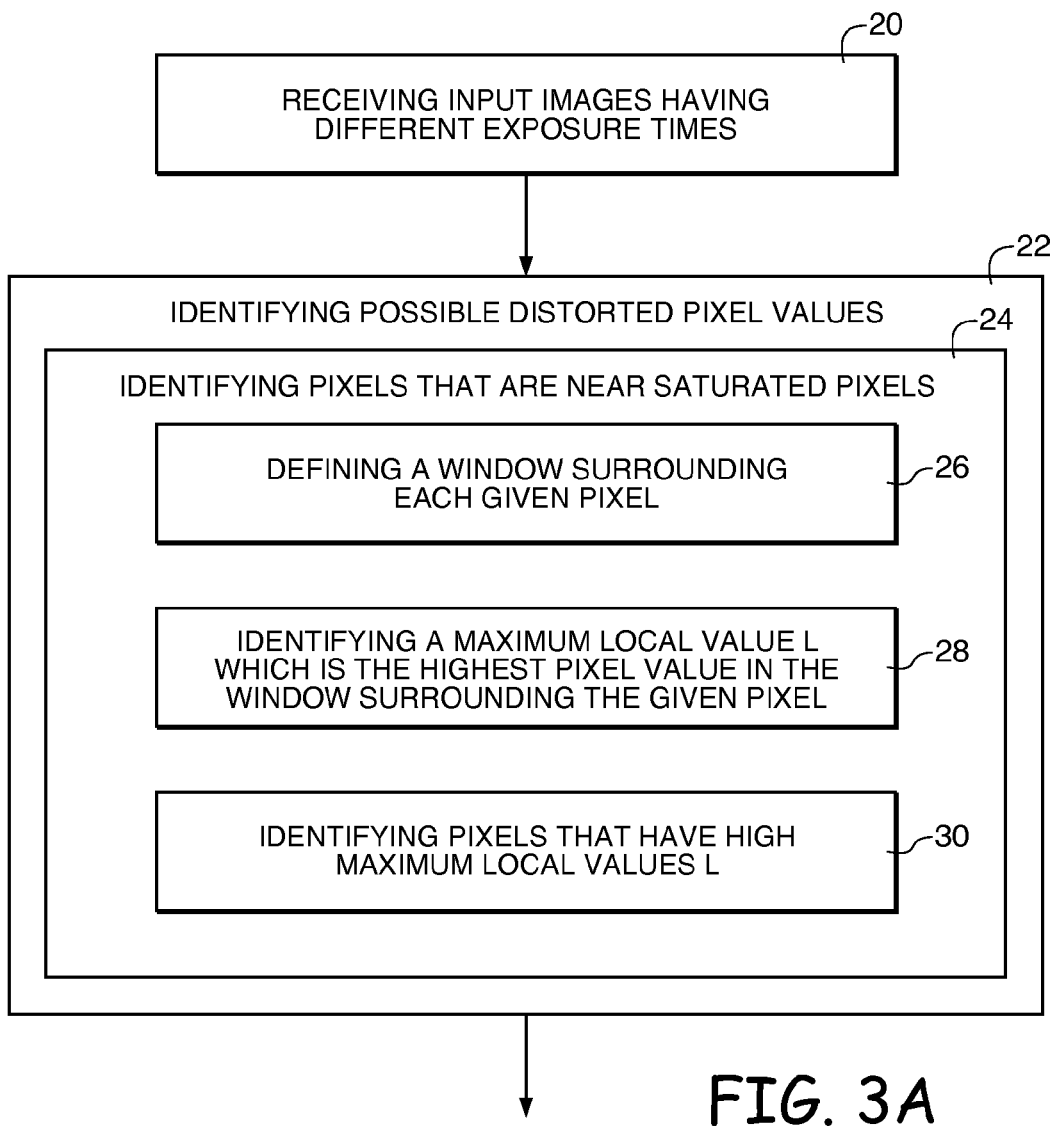
FIG. 3A is a flow chart showing steps for receiving input images and identifying potential distorted pixel values in accordance with an embodiment of the present invention.
Figure 3B:
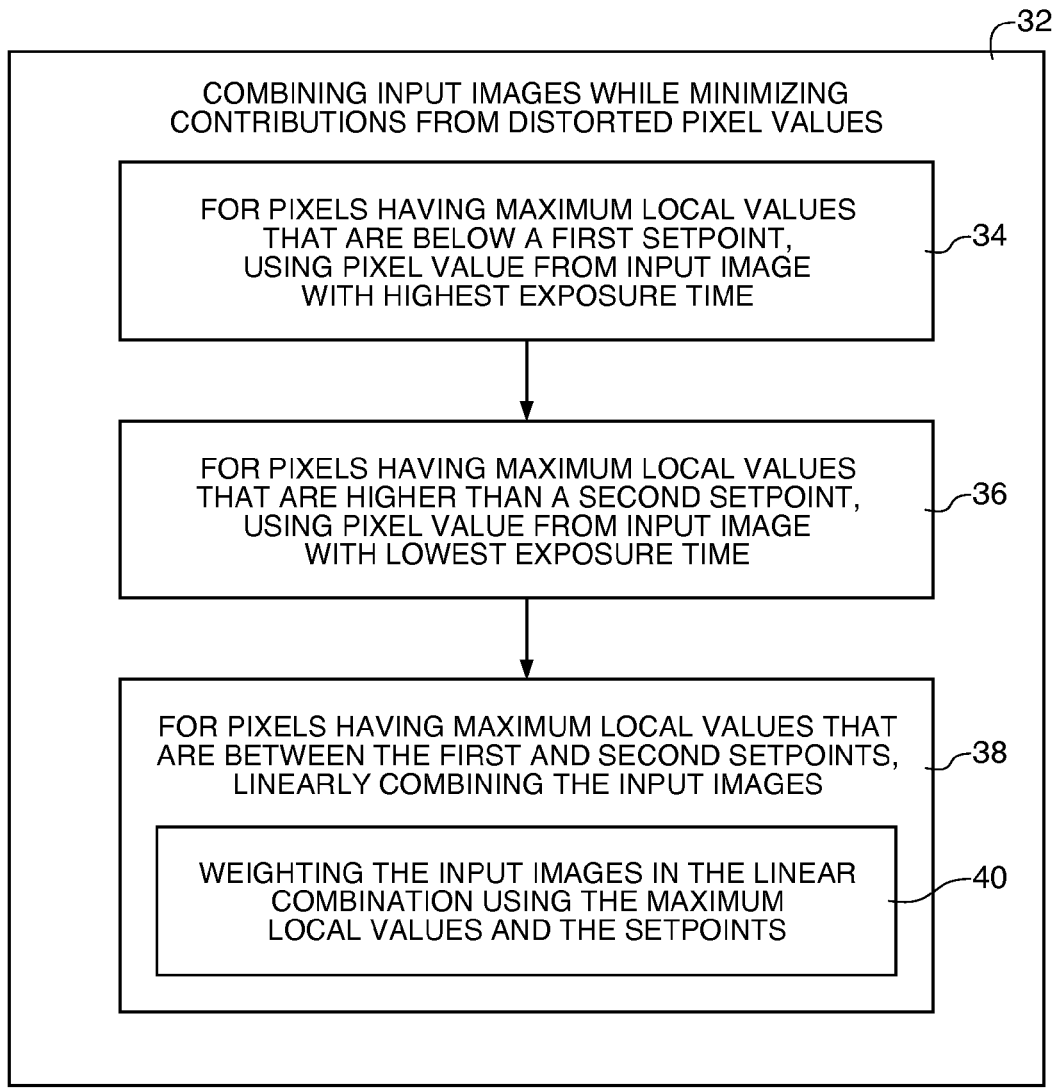
FIG. 3B is a flow chart showing steps for combining input images while minimizing contributions from distorted pixel values in accordance with an embodiment of the present invention.

Steps are shown in FIGS. 3A and 3B that may be used in processing multi-exposure images to produce a high dynamic range image while minimizing blooming charge effects.

Image processor 16 (see, e.g., FIG. 1) may receive input images from image sensor 14, as shown in step 20 of FIG. 3A. The input images may have different exposure times (integration times).

Image processor 22 may identify possible distorted pixel values, as shown in step 22 of FIG. 3A. Distorted pixel values may be distorted from blooming charge effects from neighboring saturated pixels. In step 24 of FIG. 3A, pixel values that are near saturated pixels may be identified and considered to be potentially distorted.

A window, also known as a region or area, may be taken around each pixel, as shown in step 26 of FIG. 3A. A window W of any suitable size may be taken. For example, a window may include the given pixel and adjacent pixels. A window may include the given pixel, adjacent pixels, and pixels that are two pixels away from the given pixel. A window may have a square or rectangular shape. For example, a window may have a size of 3×3 pixels, 4×4 pixels, 3×4 pixels, 5×5 pixels, larger than 5×5 pixels, or any suitable size. A window may have a shape that is not rectangular.

The highest pixel value L of the pixels inside window W may be identified, as shown in step 28 of FIG. 3A. The highest pixel value L in window W may be known as a maximal value, a maximum value, a maximum local value, or a maximum local pixel value. Each pixel (x, y) may have an associated maximal value L(x,y) for a window W centered around (x, y).

Pixels that have high associated maximal values L may be considered to be distorted from blooming charge effects. Such pixels may be identified in step 30 of FIG. 3A.

Image processor 22 may combine input images while minimizing contributions from distorted pixel values, as shown in step 32 of FIG. 3B. Image processor 22 may combine input images while filtering out pixel values affected by blooming.

Long-exposure images are generally better for low-lit portions of a scene, while short-exposure images are generally better for bright portions of a scene. Dark portions of a scene may be too dark in short-exposure images and may be affected by noise. Bright portions of a scene may saturate long-exposure images. When combining multiple-exposure input images into a high dynamic range image, input images may be combined so that short-exposure images are weighted more heavily for brighter areas and long-exposure images are weighted more heavily for darker areas.

Long-exposure images would be more likely to have saturated pixels and pixels affected by blooming charge from saturated pixels. For a particular pixel location (x,y), corresponding pixel values from short-exposure images would be less likely to be saturated or distorted by blooming charge than pixel values from long-exposure images. For pixel locations (x,y) that are identified as being potentially distorted (in step 22 of FIG. 3A), pixel values from short-exposure images may be weighted more heavily then pixel values from long-exposure images, even if pixel (x,y) is not itself one of the brighter pixels.

Pixel positions that have low maximum values L may have a low probability of being saturated or distorted by charge blooming. Pixel positions with low maximum values L also correspond to darker regions that are better captured by long-exposure images. As shown in step 34 of FIG. 3B, for pixel positions with low maximum values L, the pixel values from the longest-exposure input image may be used for the final image. If the maximum value L(x,y) for the longest-exposure input image is below a certain threshold value S1, the pixel value (x,y) for the final image may be taken directly from the pixel value (x,y) from the longest-exposure input image. Threshold value S1 may also be known as a set point.

Pixel positions that have high maximum values L may have a high probability of being saturated or distorted by charge blooming. For pixel positions (x, y) with very high maximum values L(x, y), it may be desirable to use the corresponding pixel value from the shortest-exposure image for the final image, as shown in step 36 of FIG. 3B. If the maximum value L(x,y) for the longest-exposure input image is greater than a threshold value S2, then the pixel value (x,y) from the shortest-exposure image may be used for the final image. Threshold value S2 may also be known as a threshold value.

In the example of FIG. 3B, two threshold values are used. In general, any suitable number of threshold values may be used.

For pixel positions that have intermediate maximum values L(x,y), a linear combination of input pixel values may be taken for the final image, as shown in step 38 of FIG. 3B. For example, if the maximum value L(x,y) for the longest-exposure input image is between set points S1 and S2, a linear combination of pixel values from the input image may be used for the final image. Maximum values L(x,y) may be used in weighting pixel values in the linear combination, as shown in step 40 of FIG. 3B. Set points S1 and S2, or other set points, may also be used in weighting pixel values in the linear combination.

The method of FIGS. 3A and 3B may be used in cases of two multiple-exposure input images, three multiple-exposure input images, four or more multiple-exposure input images, or any suitable number of multiple-exposure input images.

In the case of two multiple-exposure input images, the following equation may be used to calculate high dynamic range image H(x,y):

$$H(x, y) = \begin{cases} T_1(x, y), & \text{if } L(x, y) < S_1 \\ R * T_2(x, y), & \text{if } L(x, y) > S_2 \\ \frac{[(S_2 - L(x, y)) * T_1 + (L(x, y) - S_1) * R * T_2(x, y)]}{(S_2 - S_1)}, & \text{otherwise} \end{cases} \quad (2)$$

where $T_1(x,y)$ is a long-exposure image, $T_2(x,y)$ is a short-exposure image, and R is the exposure ratio between the first exposure time T1 of long-exposure image $T_1(x,y)$ and the second exposure T2 of short-exposure image $T_2(x,y)$. $L(x,y)$ is the maximum value of pixel values in a window W around pixel (x,y) for long-exposure image $T_1(x,y)$. Window W may have any suitable size.

When maximal value $L(x,y)$ is less than a first set point $S_1$, the pixel value (x,y) from long exposure image $T_1(x,y)$ may be used exclusively for pixel value $H(x,y)$ of the final image. When maximal value $L(x,y)$ is greater than a second set point $S_2$, the pixel value (x,y) from short exposure image $T_2(x,y)$ may be used exclusively for pixel value $H(x,y)$ of the final image.

When maximal value $L(x,y)$ is not less than first set point $S_1$, or greater than second set point $S_2$, e.g, when maximal value $L(x,y)$ is between set points $S_1$ and $S_2$, a linear combination of $T_1(x,y)$ and $T_2(x,y)$ may be used for $H(x,y)$ of the final image. The long exposure value $T_1(x,y)$ may be weighted by the difference between set point $S_2$ and maximal value $L(x,y)$. The short exposure value $T_2(x,y)$ may be weighted by the difference between maximal value $L(x,y)$ and first set point $S_1$, and by the exposure ratio R. The weighted pixel values may be divided by the difference between set points $S_2$ and $S_1$.

Set points $S_1$ and $S_2$ may be any suitable values. For example, when the input images have a dynamic range of 12 bits, or 4096, values for the set points can be taken as $S_2$=3900 and $S_1 = S_2 - S_{21}$ with $S_{21}$=1024, so that $S_1$=2876. Any suitable values for the set points may be used. Set point $S_1$ may be, for example, less than 75% of the dynamic range, between 50% and 75% of the dynamic range, less than 50% of the dynamic range, or any suitable value. Set point $S_2$ may be, for example, greater than ¾ of the dynamic range, greater than ⅘ of the dynamic range, between 90% and 97% of the dynamic range, or any suitable value.

The algorithm of equation (2) is an illustrative example of the method of FIGS. 3A and 3B. The algorithm of equation (2) applies a blooming filter when processing multiple-exposure images to form a high dynamic range image.

Multiple-exposure images may also be processed according to:

$$H(x, y) = \begin{cases} T_1(x, y), & \text{if } L(x, y) < S_1 \\ R * T_2(x, y), & \text{if } L(x, y) > S_2 \\ \frac{[(S_2 - T_1(x, y)) * T_1 + (T_1(x, y) - S_1) * R * T_2(x, y)]}{(S_2 - S_1)}, & \text{otherwise} \end{cases} \quad (3)$$

In the algorithm of equation (3), $L(x,y)$ is replaced by $T_1(x,y)$ in the coefficients in the third line. As long exposure value $T_1(x,y)$ is less than or equal to $L(x,y)$, the value of $(S_2 - T_1(x,y))$ of equation (3) may be greater than that of $(S_2 - L(x,y))$ of equation (2). The value of $(T_1(x,y) - S_1)$ of equation (3) may be smaller than that of $(L(x,y) - S_1)$ of equation (2). As compared with the algorithm of equation (2), the algorithm of equation (3) may put greater emphasis on long exposure image $T_1(x,y)$ and less emphasis on the short exposure image $T_2(x,y)$ in the intermediate regime where $S_1 \leq L(x,y) \leq S_2$.

Various embodiments have been described illustrating multiple exposure image processing with blooming filters.

Multiple exposure image processing may be provided that identifies pixels that may have pixel values that are distorted by blooming charge effects. The contribution from the potentially corrupted pixel values may be minimized when forming the final high dynamic range image.

Pixels that are located near to saturated or nearly saturated pixels may be considered to have potentially distorted pixel values. A maximum pixel value of pixels located in a window around a given pixel may be known as maximum pixel value L. When the maximum pixel value L is high for a particular pixel, that pixel may be considered to be potentially distorted by blooming charge effects.

Multiple exposure images may be linearly combined to form a high dynamic range image. The multiple exposure images may be weighted in the linear combination based at least in part on the maximum pixel values L. When maximum pixel values L are high, short exposure images may be weighted more heavily than long exposure images. When maximum pixel values L are low, long exposure images may be weighted more heavily than short exposure images.

When maximum pixel values L are below a certain threshold value, a long exposure image may be used exclusively for the final high dynamic range image. When maximum pixel values L are above another threshold value, a short exposure image may be used exclusively for the final dynamic range image.

Pixel values that are distorted by blooming may be filtered during image processing to produce the final high dynamic range image.

The foregoing is merely illustrative of the principles of this invention which can be practiced in other embodiments.

What is claimed is:

1. A method for processing images, comprising:
   at an image processor, receiving a plurality of input images having associated pixel values and associated dynamic ranges;
   identifying pixel values in the plurality of input images that are distorted by nearby high pixel values;
   combining the plurality of input images to form an output image while minimizing a contribution of the distorted pixel values, wherein the output image has an associated dynamic range image that is higher than the associated dynamic ranges of the input images, wherein identifying the pixel values in the plurality of input images that are distorted by nearby high pixel values comprises, for each pixel value, identifying an associated maximal regional pixel value in a region surrounding the pixel value.

2. The method defined in claim 1, wherein combining the plurality of input images to form an output image while minimizing the contribution from the distorted pixel values comprises linearly combining the plurality of input images while minimizing the contribution from the distorted pixel values.

3. The method defined in claim 1, wherein linearly combining the plurality of input images while minimizing the contribution from the distorted pixel values comprises:
   for the given pixel position, linearly combining pixel values in the plurality of input images that correspond to the given pixel position to produce a pixel value in the output image that corresponds to the given pixel position, wherein linearly combining pixel values comprises weighting each pixel value using the associated maximal regional pixel value for the pixel.

4. The method defined in claim 1, wherein identifying the pixel values in the plurality of input images that are distorted by nearby high pixel values comprises identifying pixels values that are distorted by blooming charge effects.

5. The method defined in claim 1, further comprising:
identifying saturated pixel values in the plurality of input images, wherein combining the plurality of input images to form an output image comprises minimizing a contribution from the saturated pixel values.

6. A method for processing images, comprising:
at an image processor, receiving a plurality of input images having associated pixel values and associated dynamic ranges, wherein the plurality of input images have different associated exposure times;
identifying pixel values in the plurality of input images that are distorted by nearby high pixel values; and
combining the plurality of input images to form an output image while minimizing a contribution from the distorted pixel values, comprising:
for each pixel position, weighting pixel values in the plurality of input images that correspond to the given pixel position, wherein the distorted pixel values are given less weight; and
for each pixel position, combining the weighted pixel values to produce a pixel value in the output image that corresponds to the given pixel position, wherein the output image has an associated dynamic range image that is higher than the associated dynamic ranges of the input images, wherein identifying the pixel values in the plurality of input images that are distorted by nearby high pixel values comprises, for each pixel value, identifying an associated local maximum pixel value from a window surrounding the pixel value, wherein pixel values that have high associated local maximum pixel values are considered to be distorted.

7. The method defined in claim 6, wherein weighting the pixel values in the plurality of input images that correspond to the given pixel position comprises weighting pixel values with the associated local maximum pixel values.

8. The method defined in claim 6, wherein weighting the pixel values in the plurality of input images that correspond to the given pixel position comprises weighting the pixel values with the associated local maximum pixel values and at least one threshold value.

9. The method defined in claim 6, wherein weighting the pixel values in the plurality of input images that correspond to the given pixel position comprises weighting the pixel values with a difference between a threshold value and a pixel value at the given pixel for a given one of the plurality of input images.

10. The method defined in claim 6, wherein weighting the pixel values in the plurality of input images that correspond to the given pixel position comprises weighting the pixel values with the associated local maximum pixel values and at least two threshold values.

11. The method defined in claim, 6, wherein weighting the pixel values in the plurality of input images that correspond to the given pixel position comprises:
for each pixel position, using exclusively a pixel value in the input image having an associated exposure time that is greater than the associated exposure times of the other input images when the associated local maximum pixel value of the pixel value is less than a first threshold value.

12. The method defined in claim 6, wherein weighting the pixel values in the plurality of input images that correspond to the given pixel position comprises:
for each pixel position, using exclusively a pixel value in the input image having an associated exposure time that is less than the associated exposure times of the other input images when the associated local maximum pixel value of the pixel value is greater than a second threshold value.

* * * * *